US009285126B2

(12) United States Patent
Buttignol (10) Patent No.: US 9,285,126 B2
(45) Date of Patent: Mar. 15, 2016

(54) MODULAR, PREFABRICATED RADIANT PANEL WITH INTEGRATED HEADERS

(75) Inventor: Guido Buttignol, Pordenone (IT)

(73) Assignee: ROBERTO MESSANA, Porcia (Pordenone) (IT)

( * ) Notice: Subject to any disclaimer, the term of this patent is extended or adjusted under 35 U.S.C. 154(b) by 563 days.

(21) Appl. No.: 13/259,299

(22) PCT Filed: Mar. 24, 2010

(86) PCT No.: PCT/IB2010/051293
§ 371 (c)(1),
(2), (4) Date: Nov. 21, 2011

(87) PCT Pub. No.: WO2010/109428
PCT Pub. Date: Sep. 30, 2010

(65) Prior Publication Data
US 2012/0103580 A1      May 3, 2012

(30) Foreign Application Priority Data
Mar. 27, 2009   (IT) ................... MI09A0493

(51) Int. Cl.
*F24D 3/12*      (2006.01)
*F24D 3/14*      (2006.01)

(52) U.S. Cl.
CPC ............... *F24D 3/125* (2013.01); *F24D 3/142* (2013.01); *F28F 2210/10* (2013.01)

(58) Field of Classification Search
CPC ...... F28D 1/0477; F28F 1/22; F28F 2210/10; F24D 3/12; F24D 3/122; F24D 3/125; F24D 3/127; F24D 3/142
USPC ............ 165/49, 56, 144, 171, 53; 237/67, 69
See application file for complete search history.

(56) References Cited

U.S. PATENT DOCUMENTS 1,800,150 A * 4/1931 Musgrave et al. .............. 165/56
(Continued)

FOREIGN PATENT DOCUMENTS

| DE | 10307686 | 9/2004 |
| DE | 10330480 | 2/2005 |
| EP | 0665409 | 8/1995 |

(Continued)

OTHER PUBLICATIONS

International Search Report dated Nov. 10, 2010, in corresponding PCT application.

*Primary Examiner* — M. Alexandra Elve
*Assistant Examiner* — Eric Ruppert
(74) *Attorney, Agent, or Firm* — Young & Thompson (57) ABSTRACT

Modular, prefabricated radiant panel, having a sandwich structure including a thermally insulating rear layer (1), a front layer acting as mechanical support and outer surface finish, and two radiant pipes (4) integrated in the panel for the flow of a heat-carrying fluid. The radiant pipes (4) are housed in preformed grooves (2) in the thermally insulating rear layer. In the same layer there are further provided two parallel, longitudinal grooves (3) for the housing of a pair of headers (5) which supply the radiant pipes (4). The headers (5) housed in the grooves (3) cross the entire panel and end in correspondence of the opposite short sides thereof, where they are connected to the radiant pipes (4) via T-junctions (6), a free mouth of which faces outwards for connection via sleeves (7) to T-junctions (6) of other panels, both directly and through connection pipes.

16 Claims, 4 Drawing Sheets

(56) References Cited

U.S. PATENT DOCUMENTS

| | | | | |
|---|---|---|---|---|
| 4,066,063 | A * | 1/1978 | Gross et al. | 126/665 |
| 5,740,858 | A * | 4/1998 | Ingram | 165/56 |
| 6,311,764 | B1 * | 11/2001 | Schulz et al. | 165/56 |
| 6,769,476 | B2 * | 8/2004 | Schulz et al. | 165/56 |
| 2006/0027356 | A1 * | 2/2006 | Sulzer | 165/53 |

FOREIGN PATENT DOCUMENTS

| | | |
|---|---|---|
| EP | 0743492 | 11/1996 |
| EP | 1004827 | 5/2000 |
| EP | 1835234 | 9/2007 |
| JP | 9145072 | 6/1997 |
| JP | 2001099434 * | 4/2001 |

* cited by examiner

MODULAR, PREFABRICATED RADIANT PANEL WITH INTEGRATED HEADERS

FIELD OF THE INVENTION

The present invention refers to a modular, prefabricated radiant panel for the conditioning of inner spaces, i.e. to a panel which is fully factory-assembled and ready for installation, designed to allow fast hydraulic connection to other similar panels and to the main pipes for the supply and return flow of the thermal carrier fluid, provided with a finished front surface and, finally, easy separable into panel submultiples. In particular the invention concerns the connection problems of the panels to the main pipes of the heat-carrying fluid which connect the panels to the central system for hot/cold water production.

STATE OF THE PRIOR ART

Radiant panels for room conditioning have experienced a remarkable development over the last few years and are currently one of the most interesting technical solutions to accomplish room conditioning which associates excellent performance with the opportunity of fast installation, substantially free from brickwork, and which can hence be easily employed also in already existing buildings.

The best radiant panels of this type normally have a rear, thermally insulating layer and a front layer with mechanical strength and good thermal conductivity, such as for example plasterboard. Inside, or in contact with, said front layer one or more coil pipes are furthermore housed, wherein the heat-carrying fluid is caused to circulate. The coil pipes of the panels are finally connected to external supply and return headers which supply the panels with the water coming from the central system for hot/cold water production, to accomplish a radiant-surface conditioning system.

A panel of the above-specified type, which furthermore has extremely interesting submodularity features resulting in high flexibility of installation, is the one disclosed in EP-1004827. Unlike the previously known panels, as a matter of fact the coil pipe in the panel disclosed by this patent is divided into a plurality of separate and juxtaposed circuits, independently connected to the headers of the heat-carrying fluid. Due to this construction it is possible to divide the panel, in a modular way, into parts of a height suitable for any specific application (over-door and under-window walls—stairwells), avoiding the need to provide the manufacture of special pieces for this purpose. This solution hence offers remarkable advantages, especially in terms of mounting flexibility, ease of hydraulic balancing, waste reduction, and of production standardisation, which production can occur in one size only. In the light of such remarkable advantages, in the practical use of such panel, however, some drawbacks have also been detected.

Firstly, a complex and expensive manufacturing process, especially due to the milling operation on the plasterboard required to form the coil-pipe-housing channel; as a matter of fact, this operation determines the forming of a large amount of plaster dust, the management of which remarkably complicates the plants and further creates disposal problems. Secondly, there are long installation times, since on the sides of each panel pair a pair of supply/return pipes (headers) must be arranged, and each individual circuit of the panel must then be connected independently to such headers. The header area must be insulated independently with a suitable shell previously applied to the wall or to the ceiling and finally covered by a non-active panel. This same need determines a third drawback, i.e. that the strip of wall/ceiling taken up by the headers remains necessarily passive to the radiant exchange, reducing the useful surface which can be set aside for this function. The system for the fastening of the known panels of this type further provides that the fastening profiles be connected directly to the plasterboard layer, hence determining a thermal bridge to the underlying brickwork. Lastly, with this system it is not possible to have panels wherein the front layer in sight is provided with different and additional functions (for example: fireproof, sound-absorbing, waterproof, architectural in general, etc.) different from the basic ones of mechanical support/heat conduction/external finish of the plasterboard, and this both because the milling in the rear part of the panel can imply execution problems with some types of material and, especially, because such milling locally impairs the peculiar features of the panel, which thus loses the original certification of compliance with a certain quality standard.

PROBLEM AND SOLUTION

The object of the present invention is hence to overcome the above-mentioned drawbacks, providing a panel structure which allows—despite maintaining the improved submodularity performances of the above-described known panel—a construction process free from dust, a simpler and faster installation method, the removal of non-radiant passive surfaces and of thermal bridges, and finally the opportunity to vary at will the composition and hence the functions of the front surface layer of the panel in sight. This object is achieved by means of a radiant panel having the features defined in claim 1. The dependent claims define other preferred features of the invention.

BRIEF DESCRIPTION OF THE DRAWINGS

Further features and advantages of the invention will be in any case more evident from the following detailed description of a preferred embodiment of the same, which is provided here purely as an example and must hence not be interpreted as limiting the scope of the invention. Such embodiment is illustrated in the attached drawings, wherein.

DETAILED DESCRIPTION OF THE PREFERRED EMBODIMENT

The radiant panel according to the present invention has a sandwich-like structure known per se, comprising a rear layer of thermally insulating material and a front layer provided with mechanical strength, thermal conductivity, and surface-finishing features suited to the specific application. As material for the forming of the rear layer, synthetic materials can be used, such as foamed plastic materials, such as polystyrenes or polyurethanes, or materials of a natural origin, such as cork. As material for the forming of the front layer, various types of composite layers having various functions can be used, preferably fibre-reinforced, such as for example plasterboard, fibreboard, asbestos cement, waterproof materials, sound-absorbing materials, materials of a natural origin (wood) or other similar materials. The two layers are coupled with each other by gluing and pressure, according to standard, equally widely-known procedures. For simplicity's sake, in the FIGS. 1, 2 and 3 of the attached drawings the front finish layer is shown in a see-through representation, i.e. with the edges only, to allow a clear vision of the conformation of the rear layer and of the corresponding pipes, in which layer in fact the present invention is essentially integrated, the front layer having been left with the only function—known per se—of mechanical support and external surface finish.

Figure 1:
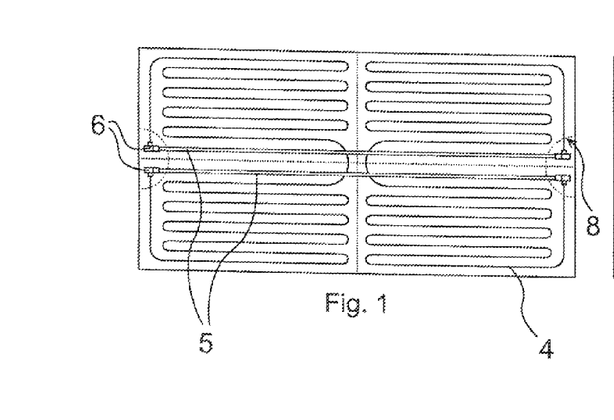
FIG. 1 is a diagrammatic top plan view of the panel according to the present invention.
Figure 4:
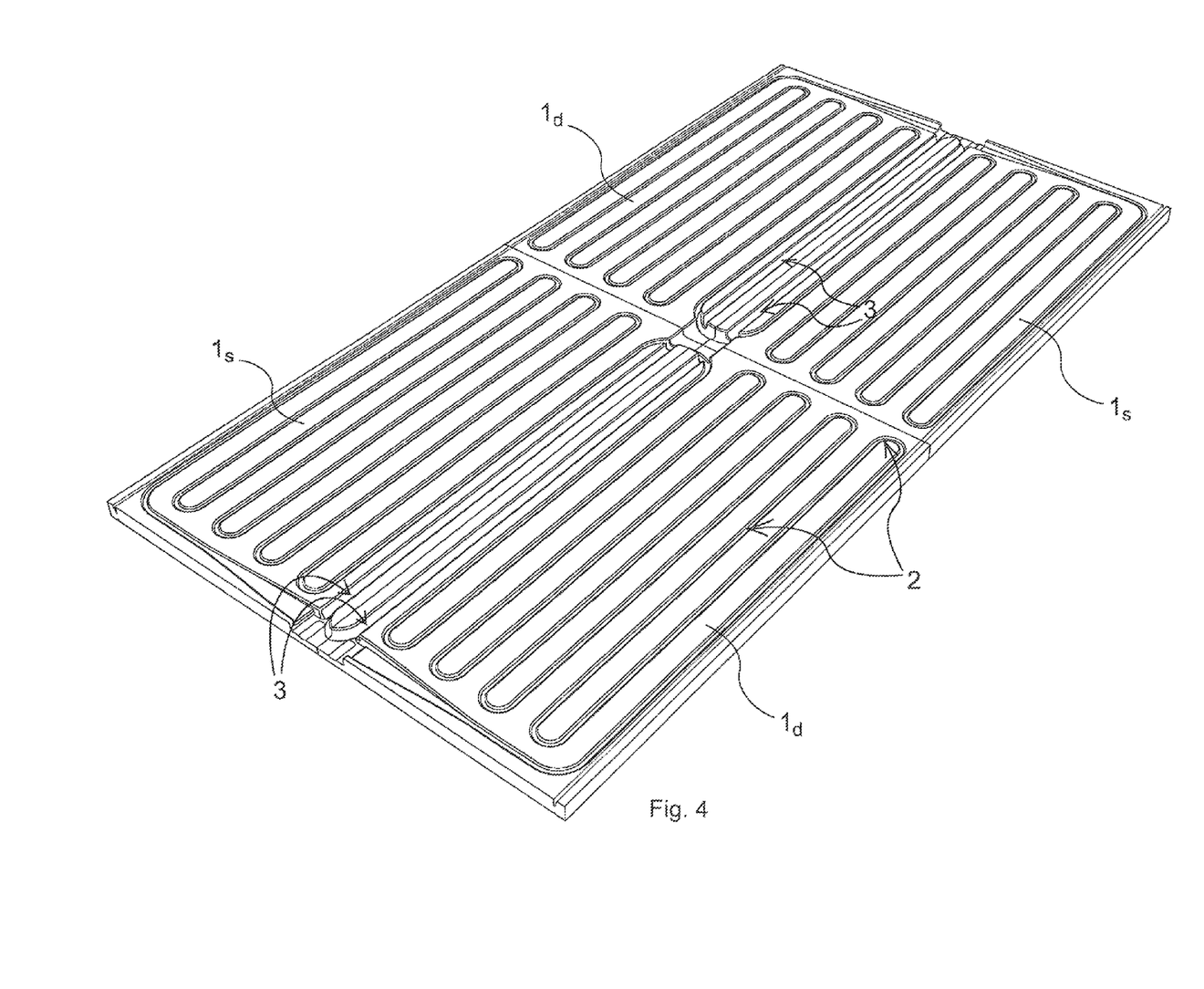
FIG. 4 is a perspective view of the rear layer of thermally insulating material of the panel of FIG. 1, wherein the grooves housing the radiant pipes and the supply headers are shown.

Unlike the above-described known-art panels, wherein the radiant pipe was embedded in the front finish layer in order to achieve better heat transfer, in the panel according to the present invention radiant pipes are arranged within suitable coil grooves 2, preformed by moulding or otherwise formed in the layer 1 of thermally insulating material, for example according to the preferred drawing shown in FIG. 4, which functional features will be described below. Advantageously—both from the point of view of manufacturing costs and of the modular divisibility of the panel—layer 1 may not be in one piece but consists of four (two) distinct rectangular elements, obtained by ideally dividing the panel along the two (one) median lines thereof, and hence of identical size. The preferred arrangement of grooves 2 within the above-said four rectangular elements forming layer 1, as shown in FIG. 4, is such as to determine only two different types of said elements, defined as right one (id) and left one (is), respectively, with reference to the direction of an observer looking at the panel from one of its minor bases, such elements being then positioned as shown in FIG. 1 to form the entire rear layer 1.

For the purpose of improving the thermal conductivity of the radiant pipe, before introducing the pipes into the respective grooves, the elements forming rear layer 1 are coated—in correspondence of the surface on which grooves 2 are formed—with a continuous metal layer, preferably of aluminium, which extends also into said grooves, thereby positively contributing to heat transfer from the radiant pipe which is inserted into said grooves to the front finish layer of the panel.

The grooves formed in elements 1s and 1d are of two types and precisely: grooves 2 for the housing of a radiant pipe 4, for example a pipe having an 8-mm diameter; and grooves 3 for the housing of headers 5 for the supply of the panel, for example a pipe having a 20-mm diameter. Grooves 2 have a coil-shaped structure extending to evenly cover the entire panel surface, while grooves 3 are rectilinear and extend side-by-side on the opposite side of a median line of the panel and for the entire length of the same. In the embodiment shown, said median line is the one having the greatest extension, but of course a solution is also possible wherein the grooves 3 of headers 5 extend along the minor median line, i.e. in a crosswise direction to the longitudinal direction of the panel. Preferably, grooves 3 are adjacent to the median line of the panel. The special groove pattern described above, as better explained in the following, allows to perform two particular functions: on the one hand allowing to separate the panel in functionally independent parts, and on the other hand gathering the hydraulic connections in restricted, easily accessible area located at the opposite sides of the panel and in the centre thereof, making installation extremely easy and quick.

As a matter of fact, according to one of the main features of the panel of the invention, said panel comprises inside and integrated in rear layer 1, in addition to radiant pipes 4, also headers 5 intended to supply the panel itself and the panels adjacent thereto in the direction of the headers. As a matter of fact, said headers are on the one hand connected hydraulically, already during manufacturing, to the radiant pipes 4 of the panel to supply them with the thermal carrier fluid and, on the other hand, they can be connected hydraulically, during installation, to corresponding headers 5 of adjacent panels, as better detailed in the following, to build the network of pipes which supplies the radiant surface comprising the panels of the invention.

Figure 5:
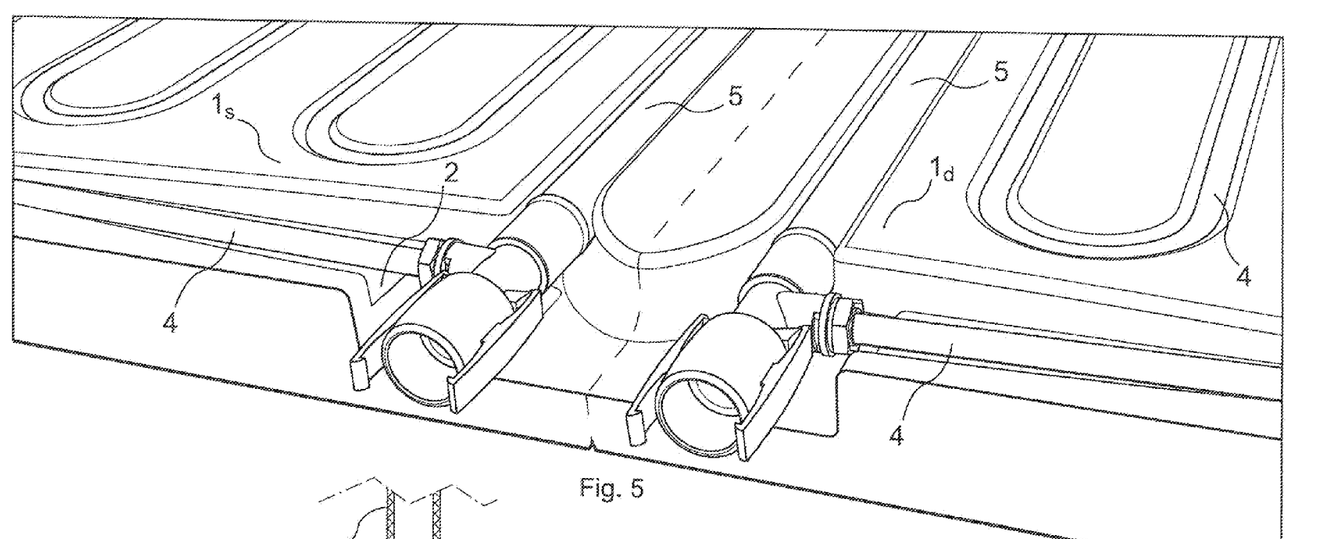
FIG. 5 is a view similar to FIG. 4, but comprising the radiant pipes and respective supply headers positioned in their housing grooves, showing, at an enlarged scale, the detail of the lateral area housing the hydraulic connections between radiant pipes and headers.
Figure 7:
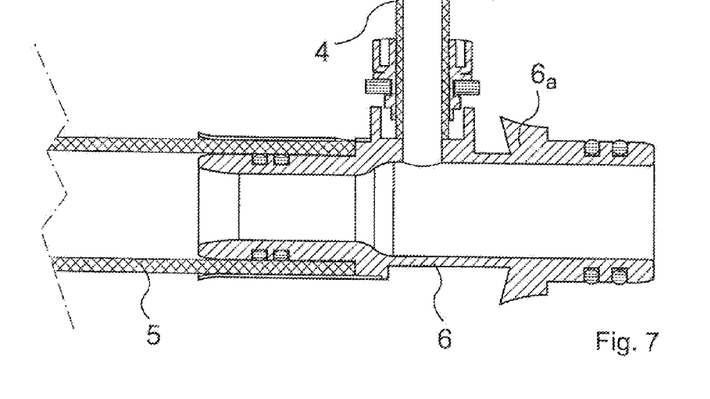
FIG. 7 is an enlarged exploded view, in a cross-section, of one of the hydraulic connections shown in FIG. 5.

In the preferred embodiment shown in the drawings, the grooves 2 intended to house pipes 4 develop along a path shaped as side-to-side spirals which extends first on an element id, and then uninterruptedly—through a semi-circular connection portion arranged below the grooves 3 of the headers, in the proximity of the centre of the rear layer 1—on an element is, adjacent to element id along the major side thereof, so that the pattern of the grooves 2 of one of the elements is mirror-like equal to that of the adjacent element id. It is thus possible to arrange inside said groove 2, extending along two adjacent elements 1d and 1s, a single pipe 4 which hence affects one half of the entire rear layer 1 and which has its two free ends in correspondence of a central position of the short sides of said layer 1, where such ends are connected to headers 5, by means of the connections schematically indicated in FIGS. 1 and 2 and shown in greater detail in FIGS. 5 and 7.

In said drawings it is possible to notice that such connections comprise a T-junction 6 which is connected, by pressure and by a ring nut connection, respectively, to a header 5 and to a radiant pipe 4, the other end of the T-junction 6 facing outwards of the panel—but without projecting outside the panel perimeter—with a male fast-engagement means into which a female sleeve 7 can be sealingly snap-inserted. The structure of sleeve 7 is clearly visible in the cross-section drawing of FIG. 7, and has been designed so as to have minimum lateral bulk and to simultaneously comprise means for steady engagement with T-junction 6, in the shape of a pair of elastic flaps 7a apt to engage with corresponding projections 6a formed on T-junction 6. Sleeve 7 is supplied both in the double-female version shown in FIGS. 5 and 7, used for the connection between the headers 5 of two adjacent panels as well as for the connection of a panel comprising a single connection pipe, and in a one-side closed, single-female version, used instead for the sealing of the headers 5 of the panels arranged in a perimeter position.

Figure 6:
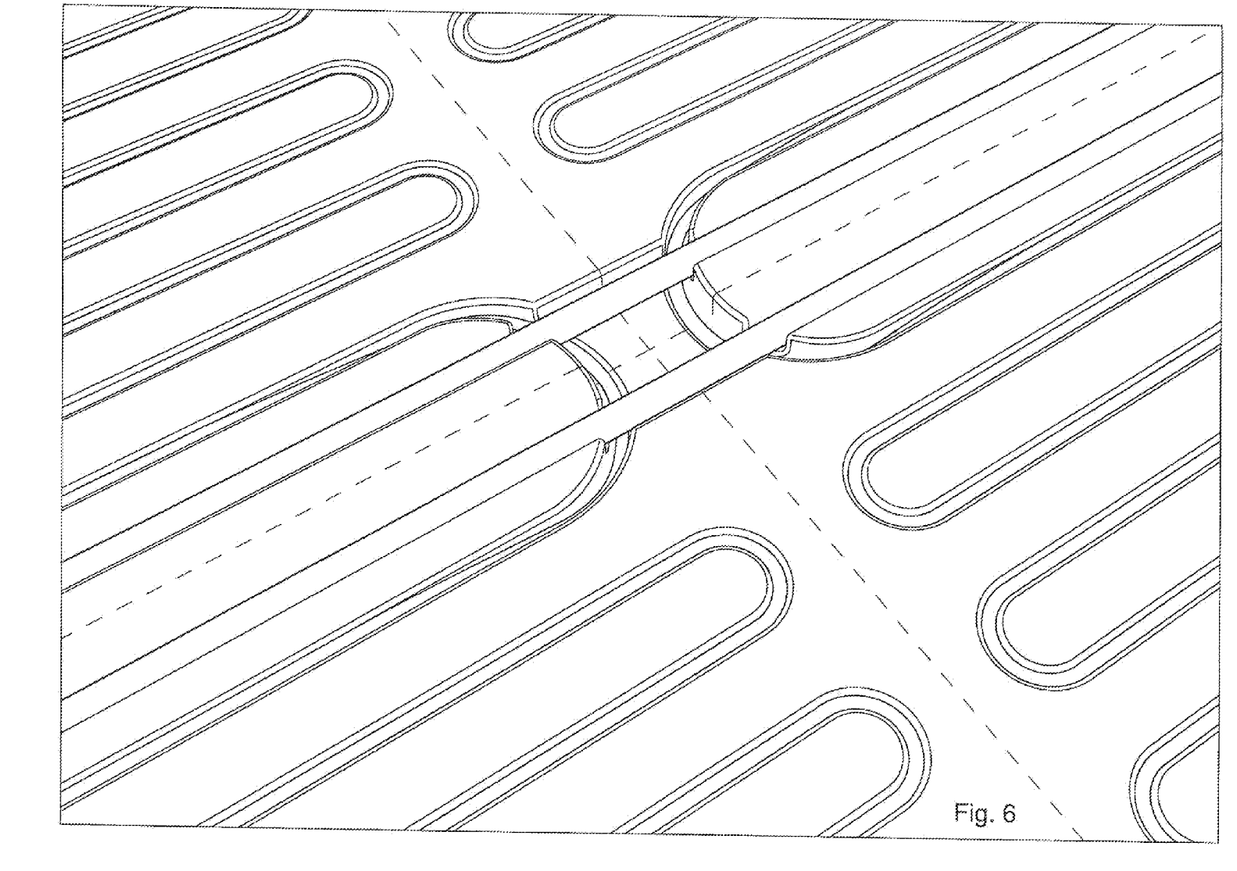
FIG. 6 is a view similar to FIG. 4, but comprising the radiant pipes and respective supply headers positioned in their housing grooves, showing, at an enlarged scale, the detail of the central area where radiant pipes and headers are arranged superposed.

In general, the section shape of grooves 2 is such as to allow the introduction therein of pipes 4 with slight interference, so as to improve the heat exchange between the pipe and the aluminium layer which covers said grooves. On the contrary, grooves 3 have such a transversal dimension to house headers 5 with slight clearance, and this in order to allow an easy axial displacement of said headers during the fitting operations, as well as the movements thereof determined by the thermal dilations during the use of the panel. However, in correspondence of the end portions of pipes 4 (FIG. 5) and of the semicircular areas for the passage of said pipes 4 between adjacent elements 1d, 1s (FIG. 6), also grooves 2 have a wider transversal dimension which allows a clearance of the pipe sufficient for the fitting operations. In particular, in correspondence of the end branches of pipes 4 which connect to joints 6, grooves 2 have a V-shape of a progressively larger width towards the centre of the panel, as clearly visible in FIGS. 4 and 5, to allow the transversal displacement of said end branches consequent to the axial displacement of headers 5 during the fitting operations of joints 6, which will be described further below.

As mentioned in the initial portion of the present description, the structure of the panel of the present invention is a sandwich-like structure comprising a thermally insulating rear layer 1 and a front finish layer in sight. Since, as seen above, the radiant pipes 4 and the headers 5 are fully housed inside the thermally insulating layer 1, no processing, and in particular no milling, needs to be carried out on the front layer, thereby dramatically simplifying the panel manufacturing process, and allowing the production of panels provided with an outer finish layer having different nature, thickness and type so that the finished radiant panel may offer, in addition to thermal-type performances, also those mechanical and surface features which are more in keeping with the specific project in which the radiant panel is inserted, thus meeting better the various architectural requirements.

The manufacturing process of the radiant panel according to the present invention hence comprises a first phase, wherein individual elements 1*d*, 1*s* are manufactured starting from the above specified materials, with forming or moulding processes well known per se which allow the forming of grooves 2 and 3. Such elements are hence coated with an aluminium layer which extends into said grooves. In a second phase, groups of four of said elements—two of type 1*d* and two of type 1*s*—are moved close and coupled with each other, possibly with temporary fastening systems (pins, adhesive tapes, templates, etc.), to form the rear layer 1 of a panel. Two pipes 4 are then arranged in the two grooves 2, which are so formed in the two halves of rear layer 1, respectively, and hence, two headers 5 are arranged in grooves 3. Pipes 4 and headers 5 are hence mutually connected, by means of joints 6, in correspondence of the central area of the short sides of the panel, all said tubes, headers and connections being entirely comprised within the panel perimeter. Finally, in a third phase of the manufacturing process, on the rear layer of the thus completed panel, a front layer of the desired type is arranged, by arranging in between a suitable layer of thermally conductive adhesive, then pressing the two layers of the panel until adhesive reticulation is obtained and therefore a steady and final coupling between the layers.

Figure 2:
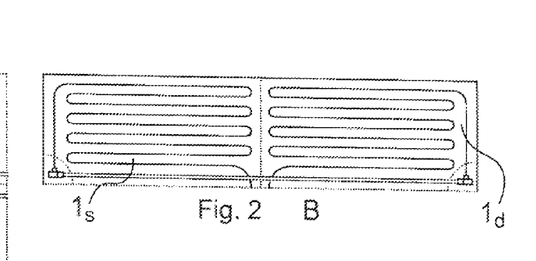
FIGS. 2A, 2B, 2C are diagrammatic top plan views showing the different options of dividing the panel into submultiples.

In order to ease the subsequent operations of hydraulically connecting the panels on site, the front layer has suitable windows 8 opening into the rear layer 1, for example in the crescent shape shown by discontinuous lines in FIGS. 1 and 2, in correspondence of the end portion of said headers 5, i.e., in the preferred embodiment, in the central portion of the two opposite short sides of the panel, where the internal and external hydraulic connections of the panel are preferably gathered, as stated above. Once the connection has been established, windows 8 will be closed by introducing therein corresponding inserts, possibly already obtained while cutting the front layer, so as to restore the continuous outer surface of the panel. Said inserts can be joined to the panel surface by plastering or remain as removable inserts. Conveniently, the rear layer 1 comprises a further groove, substantially parallel to the grooves 3, which ends in said opposed windows 8 and is apt to house electrical cables for supplying electric appliances or other services which nay be provided in, or near to, a radiant wall comprising the panels of the invention.

As stated above, the particular structure of the radiant panel allows both the integral use thereof, and the use of modular submultiples of the same. Such submultiples can be obtained by dividing a panel according to its shorter median line (FIG. 2A), according to its longer median line (FIG. 2B) or, finally, by further dividing the two above-said submultiples according to a median line perpendicular to the one of the first division (FIG. 2C). The panel division operation occurs very simply due to the fact that the rear layer already consists of four mutually adjacent, independent elements 1*d* and 1*s*. Therefore, by inserting a cutter, or other suitable cutting means, into the gap between two adjacent elements 1*d*, 1*s* it will be possible to engrave the front finish layer of the panel and cut off headers 5, pipes 4 or both such elements, depending on whether the submultiple one aims to obtain is the one shown in FIG. 2A, 2B or 2C, respectively. Regardless of the type of cutting, once the pipes have been severed and the front layer has been engraved with a bevel line, the panel is easily divided by breaking along said bevel line.

Preferably, elements 1*d* and 1*s* according to the present invention are formed in the 120×60 cm size, so as to allow the coupling of four elements with a front layer easily available on the market in the standard size of 120×240 cm. The finished radiant panel will keep this same size, remarkably easing removal, transport and installation operations, also due to the fact that—unlike the known panel described above, and as already highlighted above—it has no hydraulic connection element projecting from the outer profile of the panel. As a matter of fact, in the known panel described above, the loop pipes projecting laterally from the panel caused some drawbacks during the loading and unloading operations on and off transport means and containers and at the same time were prone to damage. These drawbacks of known panels are now fully removed by the panel of the invention.

The wall or ceiling installation of the panels according to the present invention can be accomplished very quickly and with freedom of positioning. As a matter of fact, the panel of the invention is provided with a thermally insulating layer extending across the entire width of its surface and hence does not have points of direct contact between the conductive front layer and the brickwork or the metal fastening profiles; the problem of the forming of thermal bridges is hence fully removed, which bridges are instead found in known-type products. Moreover, the rear layer of the panel has no particularly important point for fastening, not even in the presence of the median lines in which elements 1*d* and 1*s* are mutually adjacent. The installer is hence fully free to arrange the wall or ceiling fastening profiles in the preferred way, without being forced to follow any preset pattern, and he can provide to fit the panels directly to the wall or to the ceiling where the space available requires it and the insulating conditions of said supports allow it.

Once the panels have been fastened to the support, possibly using the submultiples shown in FIG. 2 to optimise the covering area, the installer will provide, through windows 8, to insert sleeves 7 between adjacent panels in correspondence of the free exit opening of joints 6, causing headers 5 to slide axially, first in one direction and then in the other, to obtain the space sufficient for the introduction and locking of sleeves 7 on the two facing joints 6 of two neighbouring panels, obviously without any need to change the position of the panels which can then be completely and finally installed on the wall before fitting the hydraulic connections. Closed-bottom, single-female sleeves 7 are then inserted at one end of each column of headers 5 thus formed (on the right hand side in FIG. 3), while the other end of the same column is connected to supply pipes M and return pipes R of the hot or cold water production plant, both directly as illustrated in FIG. 3, and indirectly by arranging in between two feeding main pipes arranged crosswise to headers 5 or of connection pipes apt to link groups of panels to said supply feeding headers, not shown in the drawings for simplicity's sake.

Figure 3:
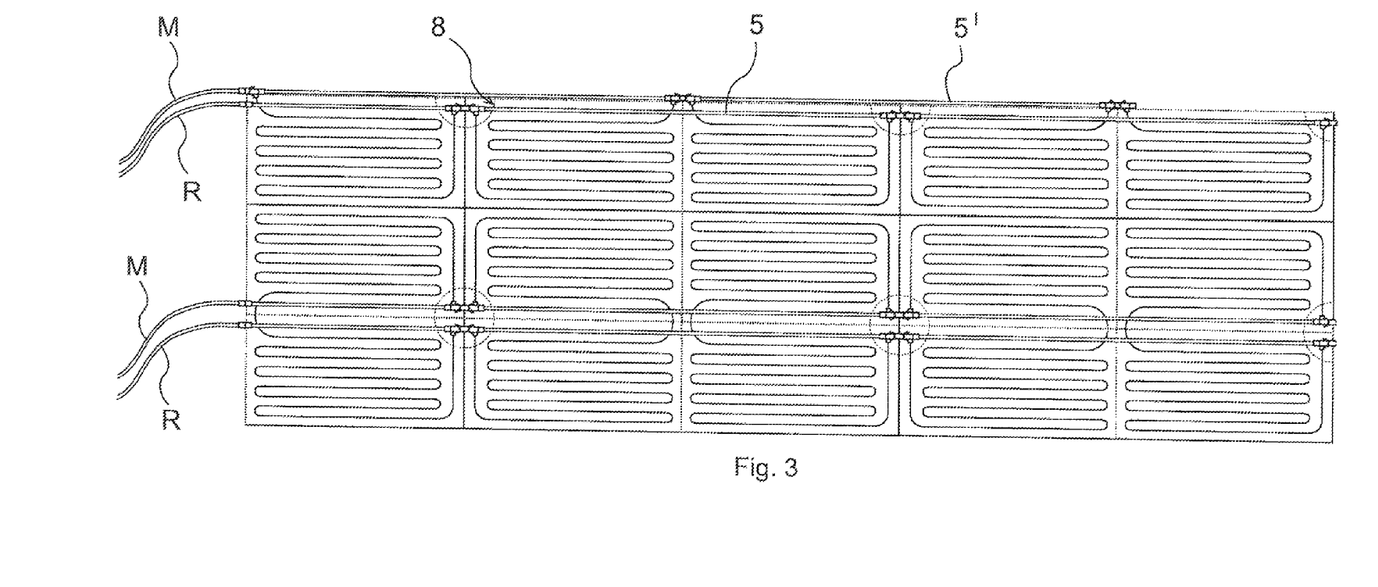
FIG. 3 is a top plan view showing a radiant surface consisting of a plurality of panels and panel submultiples according to the present invention.

When during the installation of a radiant surface submultiple elements of the panel are also used, the pipe sections which have been highlighted during the cutting operation are provided with pressure or nut ring joints, fully identical or similar to the ones illustrated above, with the possible addition of an outer header 5', as shown in FIG. 3, necessary when a longitudinal submultiple of the type shown in FIG. 2B or 2C is used.

From the preceding description it should be clear how the radiant panel of the present invention has fully reached the set object, removing all the above described drawbacks of known-art modular panels. As a matter of fact, by removing the milling of the front layer of the panel, where the radiant pipes were normally arranged, an extremely simplified manufacturing process completely free from dusts is obtained. Moreover, and for the same reason, the front layer of the panel can be chosen at will, depending on its desired mechanical features, finish features or other features, without such features being deteriorated by milling. Moreover, by providing passing-through, panel-integrated headers, it is possible to accomplish during manufacture a great deal of the required outer hydraulic connections while the remaining part of the hydraulic connection can be fitted once the panels are completely installed on the wall; installation procedure are so greatly simplified and the overall installation procedure of a radiant surface formed by the panels of the invention hence turns into a very simple and fast one. Due to the particular mutual arrangement of the inner headers and of the radiant pipes, it is finally possible to have excellent panel submodularity—further improved by the preformed cutting lines obtained by forming rear layer 1 using four separate elements—thereby maintaining the high optimisation in the installation operations typical of the panel of the above described known art, however, without any drawback thereof. Lastly, due to the fact that the rear layer of the panel is not discontinuous and that the presence of gaps between the panels to house the headers is no longer necessary, the presence of non-radiant passive surfaces and of thermal bridges with the underlying wall or ceiling is fully removed.

However, it is understood that the invention must not be considered limited to the particular arrangement illustrated above, which represents only an exemplifying embodiment thereof, but that several variants are possible, all within the reach of a person skilled in the field, without departing from the scope of protection of the invention, as defined by the following claims.

The invention claimed is:

1. A pair of modular, prefabricated radiant panels, each of said pair of modular, prefabricated radiant panels comprising:
a sandwich structure having a length in a length direction, a shorter width in a width direction, a median line running in the length direction in a middle of the width of the sandwich structure, and a transverse line that extends transverse to the median line at a middle of the length of the sandwich structure, each sandwich structure further comprising
    i) a thermally insulating rear layer (1) having coil grooves (2) and header grooves (3) formed therein,
    ii) a front layer with mechanical strength and outer surface finish features,
    iii) between the rear layer and the front layer, a) radiant pipes (4) integrated in the panel for the flow of a heat-carrying fluid, b) a pair of headers (5) which supply said one or more radiant pipes (4), and c) T-junction joints (6) that connect end branches of said one or more radiant pipes (4) to a corresponding one of said pair of headers (5), and
    iv) a thermally conductive adhesive providing adhesive reticulation between the rear layer and the front layer,
wherein said radiant pipe (4) is housed in the coil grooves (2) formed in said thermally insulating rear layer (1),
said pair of headers (5) which supply said radiant pipe (4) are housed in the header grooves (3),
wherein said radiant pipe (4) includes a portion that crosses over the median line and extends across the pair of headers (5),
wherein said header grooves (3) are substantially parallel to a median line of the panel and are arranged at the two sides thereof,
wherein said headers (5) cross the entire panel and end within a perimeter of the panel with connections opening outward of the panel at the perimeter of the panel, in correspondence of opposite sides thereof,
wherein each said header grooves (3) has a dimension to house a respective one of said pair of headers (5) with clearance sufficient to allow axial displacement of each header during fitting operation of i) a first panel of said pair of modular, prefabricated radiant panels with ii) a corresponding header of a second panel of said pair of modular, prefabricated radiant panels, and
said coil grooves (2) have a V-shape portion of a progressively larger width towards the median line in correspondence of the end branches of pipes (4) at each said T-junction joint (6) such that an end width of each V-shape portion adjacent the median line allows the axial displacement of said headers (5) and a displacement of said end branches of pipes (4) at said T-junction joints (6) connecting said end branches of pipes (4) to said headers (5), and
thermally conductive adhesive arranged between the front and rear panels and adhering the front to the rear panels by providing adhesive reticulation between the rear layer and the front layer, and
wherein the panels are factory-assembled panels.

2. The pair of modular, prefabricated radiant panels as claimed in claim 1, wherein,
a free opening of each said T-junction joints (6) connecting said end branches of pipes (4) to said headers (5) includes a quick-release connecting system for connection to a connection sleeve (7), and
when said first and second panels are assembled with each other, the connection sleeve (7) connects the free openings of corresponding T-junction joints (6) of the first and second panels.

3. The pair of modular, prefabricated radiant panels as claimed in claim 1, wherein each said sandwich structure is configured for ceiling mounting as a ceiling panel.

4. A modular, prefabricated radiant panel, comprising:
a sandwich structure having a length in a length direction, a shorter width in a width direction, a median line running in the length direction in a middle of the width of the sandwich structure, and a transverse line that extends transverse to the median line at a middle of the length of the sandwich structure, the sandwich structure comprising i) a thermally insulating rear layer (1) having serpentine coil grooves (2) and a pair of header grooves (3) formed therein, a longitudinal length of the coil grooves and a longitudinal length of the header grooves running in the length direction, adjacent length portions of the coil grooves being arranged side-by-side in the width direction, each header groove of the pair of header grooves (3) being located adjacent and on one side of the median line, ii) a front layer with mechanical strength and outer surface finish features, and iii) between the rear layer and the front layer, a) one or more serpentine radiant pipes (4) integrated in the panel for the flow of a heat-carrying fluid such that length-wise portions of said one or more radiant pipes (4) extend longitudinally in the length direction with adjacent ones of said length-wise portions of said one or more radiant pipes (4) being arranged side-by-side in the width direction, b) a pair of headers (5) which supply said one or more radiant pipes (4), each header of the pair of headers being located adjacent and on opposite side of the median line, and c) T-junction joints (6) that connect end branches of said one or more radiant pipes (4) to a corresponding one of said pair of headers (5), wherein said radiant pipe (4) is housed in the coil grooves (2) formed in said thermally insulating rear layer (1), said pair of headers (5) which supply said radiant pipe (4) are housed in the header grooves (3), wherein said radiant pipe (4) includes a portion that crosses over the median line and extends across the pair of headers (5), wherein said headers (5) cross the entire panel and end within a perimeter of the panel with connections opening outward of the panel at the perimeter of the panel, in correspondence of opposite width end sides thereof, said headers (5) and said radiant pipe (4) being symmetric about the transverse line with a first one of the serpentine radiant pipes (4) being located on a first half of the sandwich structure on a first side of the transverse line and a second one of the serpentine radiant pipes (4) being located on a second half of the sandwich structure on an opposite second side of the transverse line, wherein each said header grooves (3) has a sufficient dimension to house a respective one of said pair of headers (5) with clearance sufficient to allow axial displacement of each header during fitting operation with a corresponding header of another of said modular, prefabricated radiant panel, and said coil grooves (2) have a V-shape portion of a progressively larger width towards the median line in correspondence of the end branches of pipes (4) at each said T-junction joint (6) such that an end width of each V-shape portion adjacent the median line allows the axial displacement of said headers (5) and a sufficient displacement of said end branches of pipes (4) at said T-junction joints (6) connecting said end branches of pipes (4) to said headers (5), thermally conductive adhesive arranged between the front and rear panels and adhering the front to the rear panels by providing adhesive reticulation between the rear layer and the front layer, and wherein the panel is a factory-assembled panel.

5. Radiant panel as claimed in claim 4, wherein said radiant pipe (4) forms two independent circuits, each of which affects one half of the panel, in a division according to the transverse line, the end branches of each radiant pipe (4) being arranged in the proximity of the width end sides of the sandwich structure and the end portion of said headers (5) from the panel, whereto they are hydraulically connected through said T-junction joints (6).

6. Radiant panel as claimed in claim 4, wherein a free opening of said T-junction joints (6) faces outward of the panel, and the free opening has a quick-release connecting system for connection to a connection sleeve (7).

7. Radiant panel as claimed in claim 4, wherein said median line of the panel runs parallel to the headers.

8. Radiant panel as claimed in claim 4, wherein,
  a free opening of one of said T-junction joints (6) faces outward of the panel, and the free opening has a quick-release connecting system connected to a connection sleeve (7), and
  when said modular, prefabricated radiant panel is assembled, at the installation site, with said other of said modular, prefabricated radiant panel, said connection sleeve (7), further connects to a corresponding quick-release connecting system of the free opening of the said one T-junction joint (6) of the other of said modular, prefabricated radiant panel.

9. Radiant panel as claimed in claim 4, wherein said rear layer (1) consists of four separate, equal-size elements divided, respectively, along the transverse and median lines of said panel.

10. Radiant panel as claimed in claim 4, wherein said sandwich structure is configured for ceiling mounting as a ceiling panel.

11. Radiant panel as claimed in claim 4, wherein said rear layer (1) consists of two separate, equal-size elements divided, respectively, along said median line of said panel.

12. Radiant panel as claimed in claim 11, wherein said elements are formed of a foamed plastic material.

13. Radiant panel as claimed in claim 11, wherein said elements are made of a natural-origin material.

14. Radiant panel as claimed in claim 4, wherein said front layer is made of composite, fibre-reinforced materials, selected from the group consisting of plasterboard, fibreboard, asbestos cement, waterproof materials, sound-absorbing materials, and materials of a natural origin.

15. Radiant panel as claimed in claim 14, wherein said front layer of the panel has access windows (8) which open into the rear layer (1) in correspondence of the end portions of said headers (5), allowing access to the hydraulic connections between said radiant pipes (4) and said headers (5) of the panel.

16. Radiant panel as in claim 15, wherein said rear layer (1) comprises a further groove, substantially parallel to the header grooves (3), which ends in said opposed windows (8) and is apt to house electrical cables.

* * * * *